United States Patent
Frielinghaus et al.

(10) Patent No.: US 8,265,361 B2
(45) Date of Patent: Sep. 11, 2012

(54) AUTOMATIC TRANSFER OF OUTLINED OBJECTS FROM ONE DATA SET INTO ANOTHER DATA SET

(75) Inventors: Nils Frielinghaus, Helmstetten (DE); Stefan Achatz, Freising (DE); Andreas Lang, München (DE); Carsten Raupach, Feldkirchen (DE)

(73) Assignee: BrainLAB AG, Feldkirchen (DE)

( * ) Notice: Subject to any disclaimer, the term of this patent is extended or adjusted under 35 U.S.C. 154(b) by 942 days.

(21) Appl. No.: 12/258,807

(22) Filed: Oct. 27, 2008

(65) Prior Publication Data

US 2009/0110294 A1   Apr. 30, 2009

Related U.S. Application Data

(60) Provisional application No. 60/982,761, filed on Oct. 26, 2007.

(51) Int. Cl.
*G06K 9/00* (2006.01)
(52) U.S. Cl. .................................. 382/128; 382/294
(58) Field of Classification Search .................. 382/128, 382/131, 173, 294
See application file for complete search history.

(56) References Cited

U.S. PATENT DOCUMENTS

| | | | |
|---|---|---|---|
| 5,568,384 A | 10/1996 | Robb et al. | 364/419.13 |
| 5,633,951 A | 5/1997 | Moshfeghi | 382/154 |
| 5,970,499 A * | 10/1999 | Smith et al. | 707/104 |
| 6,021,213 A | 2/2000 | Helterbrand et al. | 382/128 |
| 6,226,418 B1 | 5/2001 | Miller et al. | 382/294 |
| 7,117,026 B2 | 10/2006 | Shao et al. | 600/411 |
| 2003/0210820 A1 | 11/2003 | Lachner et al. | 382/209 |
| 2005/0053267 A1 * | 3/2005 | Mostafavi | 382/128 |

* cited by examiner

*Primary Examiner* — Andrew W Johns
(74) *Attorney, Agent, or Firm* — Renner, Otto, Boisselle & Sklar, LLP

(57) ABSTRACT

A method for automatically localizing at least one object or structure in a second data set is provided. A reference data set is provided, and at least one object or structure is outlined or marked in the reference data set, the outline or marking information being a first or reference label data set. A mapping function is determined, using which said reference data set is approximately mapped onto said second data set, and the reference label data set assigned to said reference data set is transformed into a second label data set using said mapping function.

17 Claims, 5 Drawing Sheets

US 8,265,361 B2

AUTOMATIC TRANSFER OF OUTLINED OBJECTS FROM ONE DATA SET INTO ANOTHER DATA SET

RELATED APPLICATION DATA

This application claims priority of U.S. Provisional Application No. 60/982,761 filed on Oct. 26, 2007, which is incorporated herein by reference in its entirety.

FIELD OF THE INVENTION

The present invention relates to the automatic transfer of outlined objects from one data set, preferably a medical data set, into another data set which is preferably related to the first data set, such as e.g. the transfer of the position of a tumor outlined in a first CT scan to a second later CT scan.

The present invention relates generally to a method and a device for automatically localizing, measuring and/or visualising at least one structure or object in an image or in a data set based on a previous or similar data set or image and, more particularly, to a method and a device for automatically localizing particular objects, such as e.g. tumors or brain structures, in images recorded using a nuclear spin resonance method, CT-scan, Cone Beam CT, or other modality.

BACKGROUND OF THE INVENTION

In order to examine persons, in particular in order to prepare surgical treatments or operations or radiotherapy treatments, particular patient areas of interest are often imaged using known methods, such as for example computer tomography (CT), nuclear spin resonance (MRI) or ultrasound methods. These imaging methods provide a patient-specific data set, such as for example tomographs of an area of an organ, e.g. the liver represented by various grey-scale value distributions.

In order to examine the patient or to prepare a treatment or an operation, it is often important to be able to determine which object or anatomical structure is assigned to a particular grey-scale value distribution of an image measured in this way. For example, it can be important to localize outlines of a particular area of the brain or the surfaces of an object, such as a tumor or a bone in an image.

U.S. patent application Ser. No. 10/430,906 discloses a method for automatically localizing at least one structure in a data set obtained by measurement, said method comprising predetermining a reference data set, determining a mapping function; mapping the reference data set onto the measured data set; and transforming a reference label data set, which is assigned to the reference data set, into an individualized label data set using the determined mapping function.

U.S. Pat. No. 5,633,951 proposes mapping two images obtained from different imaging methods, such as, for example, nuclear spin resonance and computer tomography, onto each other. For aligning these images, a first surface is obtained from one image using individual scanning points which define a particular feature of an object, and the surface of a first image is superimposed onto a corresponding surface of the second image. This method, however, is very costly and requires surfaces to be determined before aligning the images.

U.S. Pat. No. 5,568,384 describes a method for combining three-dimensional image sets into a single, composite image, where the individual images are combined on the basis of defined features of the individual images corresponding to each other. In particular, surfaces are selected from the images and used to find common, matching features.

A method for registering an image comprising a high-deformity target image is known from U.S. Pat. No. 6,226,418 B1. In this method, individual characteristic points are defined in an image and corresponding points are identified in the target image in order to calculate a transformation from these, using which the individual images can be superimposed. This method cannot be carried out automatically and is, consequently, very time-consuming due to its interactive nature.

U.S. Pat. No. 6,021,213 describes a method for image processing, wherein an intensity limit value for particular parts of the image is selected to identify an anatomical area. A number of enlargements or expanding processes of the area are performed using the limit value, until the identified area fulfils particular logical restrictions of the bone marrow. This method is relatively costly and has to be performed separately for each individual anatomical area of interest.

U.S. Pat. No. 7,117,026 discloses a method for non-rigid registration and fusion of images with physiological modelled organ motions resulting from respiratory motion and cardiac motion that are mathematically modelled with physiological constraints. A method of combining images comprises the steps of obtaining a first image dataset of a region of interest of a subject and obtaining a second image dataset of the region of interest of the subject. Next, a general model of physiological motion for the region of interest is provided. The general model of physiological motion is adapted with data derived from the first image data set to provide a subject specific physiological model. The subject specific physiological model is applied to the second image dataset to provide a combined image.

In order to exactly localize particular structures, in for example nuclear spin resonance images, it is often necessary for particular objects or anatomical structures of interest to be manually identified and localized by an expert. This is typically accomplished by individually examining the images taken and highlighting the structures based on the knowledge of the specialist, for example, by using a plotting program or particular markings. This is a very time-consuming, labor-intensive and painstaking task, which is largely dependent on the experience of the expert. Especially if a series of similar images or data sets is taken from a specific region, such as during a breathing cycle, the manual identification of the object in each data set is required and thus quite time consuming.

SUMMARY OF THE INVENTION

It is an object of the present invention to propose a method and a device for automatically localizing at least one object or structure in a data set, such as for example one or a number of computer tomographic images or Cone-Beam-CTs, using which the object or anatomical structure can be localized in the data set(s) fully automatically, based on preferably a single e.g. first or reference data set having this structure already localized, within a short period of time. The localization of the structure in the first or reference data set can be done manually, wherein for example all objects of interest are outlined manually, e.g. in a data set taken at a specific point of time. It is also possible to localize the structure or structures automatically, as described in U.S. patent application Ser. No. 10/430,906.

If for example different data sets, such as 3D scans taken from a specific region at different times, exist for one patient, any of these data sets can be chosen as being a reference data set. All objects of interest which should be identified in this and the other data sets can be outlined automatically or manually in the selected reference data set, which is for example taken at a specific time at the beginning or within a repeating cycle, as e.g. the breathing cycle. The outlined or marked objects of the reference data set can then be automatically transferred from this reference data set to all other data sets. It is advantageous that all data sets have a common frame of reference, i.e. are fused to each other. The invention is especially useful for so called 4-D CT data sets showing e.g. tumor movement during the breathing cycle or follow-up scans showing tumor growth or shrinking over time.

According to one aspect of the invention a method for automatically localizing at least one anatomical structure in a further or second data set is based on a first data set having the structure or objects already localized or outlined. The further data set, such as for example one or more images having a defined positional relationship to each other or a volumetric or three-dimensional data set, is compared to the reference data set, such as for example a previously taken data set or image being for example a first CT scan out of e.g. ten different CT scans taken during a breathing cycle.

A function for mapping the reference data set onto the further data set(s) can be determined using known methods and algorithms based, for example, on the intensity distribution in the respective data sets. Such known methods include those described in:

A. W. Toga, ed., Brain Warping. San Diego: Academic Press, 1999;
G E Christensen, Rabbit, R D, M I Miller. 3D brain mapping using a deformable neuroanatomy. Physics in Medicine and Biology, March 1994, (39) pp. 609-618;
Morten Bro-Nielsen, Claus Gramkow: Fast Fluid Registration of Medical Images. VBC 1996: 267-276;
J.-P. Thirion. Image matching as a diffusion process: an analogy with Maxwell's demons. Medical Image Analysis, 2(3):243-260, 1998;
P. Cachier, X. Pennec, and N. Ayache. Fast Non-Rigid Matching by Gradient Descent: Study and Improvements of the Demons Algorithm. Research Report 3706, INRIA, June 1999, each of which is incorporated herein by reference in its entirety.

A comparison can be made between the further data set(s) and the reference data set, using for example intensities or brightness values of the pixels or voxels contained therein, which makes the use of particular user-defined individual features such as points, curves and surfaces in the further data set(s) superfluous. Based on the comparison between the further data set(s) and the reference data set, a mapping function including for example mapping instructions for pixels or voxels can be determined, which maps the reference data set onto the further data set(s). Alternatively, an inverse function can be determined, which maps the further data set(s) onto the reference data set. The mapping function can be used to map a so-called label data set which is assigned to the reference data set and includes e.g. the manually and/or automatically outlined objects. Label data sets can be assigned to reference data sets, such as for example the first manually outlined CT scan out of a series of CT scans showing different moments of the breathing cycle, and can contain information corresponding to part of the two-dimensional or three-dimensional reference data set of a particular anatomical object, structure or function, i.e. the label data set can contain the anatomical assignment or description of the marked or outlined anatomical objects or structures of the reference data set.

If the mapping function for mapping the reference data set, as e.g. a first CT scan, onto the further data set, as e.g. a subsequent or second CT scan is known, then the same mapping function can be used to map or transform or transfer the label data set assigned to the reference data set including e.g. one or more manually outlined objects, into a further label data set assigned to the further data set, i.e. which defines what for example the anatomical structures or manually outlined objects in the further data set are like. The reference label data set transferred or mapped in accordance with the invention by the mapping function thus represents a label data set using which for example all the anatomical structures or outlined objects in the further data set(s) can be localised, even if these objects are shifted or changed in shape. This method can run fully automatically and no interaction or manual processing by an expert is required.

In accordance with one embodiment, the data values of the reference data set can be obtained by the same imaging method as is used to obtain the further data set(s), such as for example computer tomography (CT), cone beam reconstruction, nuclear spin resonance (MRI), positron emission tomography (PET), ultrasound or the like. This generates data sets which can easily be compared with each other.

The method in accordance with the invention can be used both with two-dimensional data sets, such as images of a particular incision plane through a body, or also with three-dimensional data sets, represented for example by voxels, in order to identify objects or anatomical structures in the respective data sets. The corresponding data sets can be compared with corresponding two-dimensional or three-dimensional reference data sets in order to generate a mapping function which is applied to the reference label data sets including the position or formation of the outlined objects, to obtain a two-dimensional or three-dimensional further label data set assigned to the corresponding further two-dimensional or three-dimensional data set(s). This further label data set includes the outlines or positions of the elements, which were marked in the reference data set, in the respective further data set(s).

In one embodiment, admissible operators for changing or warping the (reference) data set can be used to obtain the mapping function. These include translating, shifting, rotating, deforming or shearing, each of which can be combined according to the manner of the further data sets and reference data sets, to map the reference data set onto the further data set two-dimensionally or three-dimensionally using a mapping function. Three-dimensionally, a mapping instruction, such as a shifting vector, can be assigned to each voxel of the reference data set, in order to map the voxel of the reference data set onto the corresponding voxel of the further data set. Due to the large differences between the individual data sets, it is generally not sufficient to use basic affine mapping, such that an automatic fluid-elastic registration algorithm can be used, which maps the reference data set onto the further data set or registers it as easily as possible. This typically deforms or warps the reference data set elastically.

It can be advantageous to select the admissible operators such that particular anatomical ancillary conditions are maintained, i.e., that no self-penetrating surfaces, discontinuities or fractures in the anatomical structures are generated by mapping. If, for example, injured or fractured anatomical structures are present, such as a broken vertebra, then the ancillary conditions mentioned above cannot or can only partially be predetermined, allowing for example discontinuities or fractures.

The mapping function can be calculated hierarchically in a number of stages. First, for example, the reference data set and/or the further data set can be roughly aligned by a rigid translation, i.e. only shifting and rotating, such that said data sets approximately match. When capturing data in the area of the head, for example, the data representing the head can be approximately superimposed and aligned with respect to each other. The viewing direction of the heads defined by the respective data sets, for example, can be approximately the same. An elastic transformation, possibly also in combination with a further rigid transformation, is then carried out, wherein for example enlarging, reducing or shearing operators are used.

According to one embodiment a volumetric image data set, e.g. a CT or MRI scan, is given having one or more different objects outlined to specify e.g. tumor tissue for treatment or risk organs to spare during treatment. This automatically or manually outlined data set being the reference data set will be correlated or fused to the other or further data set(s) available for this patient.

Preferably the outlined or reference data set will be distorted (elastic fusion) to fit best to the correlated or further data set(s). The outlined structures of the reference data set can be copied to the correlated or further data set and then the calculated distortion can be used on the outlined objects.

As a result, all objects in the outlined or reference data set are available and can be localized in the new or further data set(s) and can be adapted to the changed position or anatomy.

Thus, once the reference data set and the further data set(s) have been registered or aligned, the outlined objects, boundaries or marked surfaces from the reference (label) data set can be determined in the further data set(s) by using the determined mapping function for generating the further label data set.

In accordance with another aspect, the present invention relates to a computer program, which performs one or more of the method steps described above when it is loaded in a computer or run on a computer. The invention further relates to a program storage medium or a computer program product containing or storing such a program.

In accordance with another aspect, the invention relates to the use of the method described above for preparing or planning a surgical operation or a treatment, such as in the area of radiotherapy, brain surgery or radio-surgery.

In accordance with another aspect, the present invention relates to a device for automatically localizing at least one object or structure in a data set obtained by measurement. This device can include an input device for inputting one or more measured data set(s), a data base in which at least one reference data set together with a corresponding reference label data set including e.g. outlined objects is stored, and a computational unit which performs one or more of the method steps described above.

The device can comprise a measuring device, such as for example a computer tomograph, a nuclear spin resonance device or the like, to obtain corresponding data sets for a patient or a body. The system can include a data output device, such as, for example, a screen, on which, for example, the measured data set in a particular incision plane, a reference data set and the information assigned to the reference label data set or the further label data set, superimposed as appropriate onto the reference data set or the further data set, can be displayed.

BRIEF DESCRIPTION OF THE DRAWINGS

These and further features of the present invention will be apparent with reference to the following description and drawings, wherein.

DETAILED DESCRIPTION OF THE INVENTION

Figure 1:
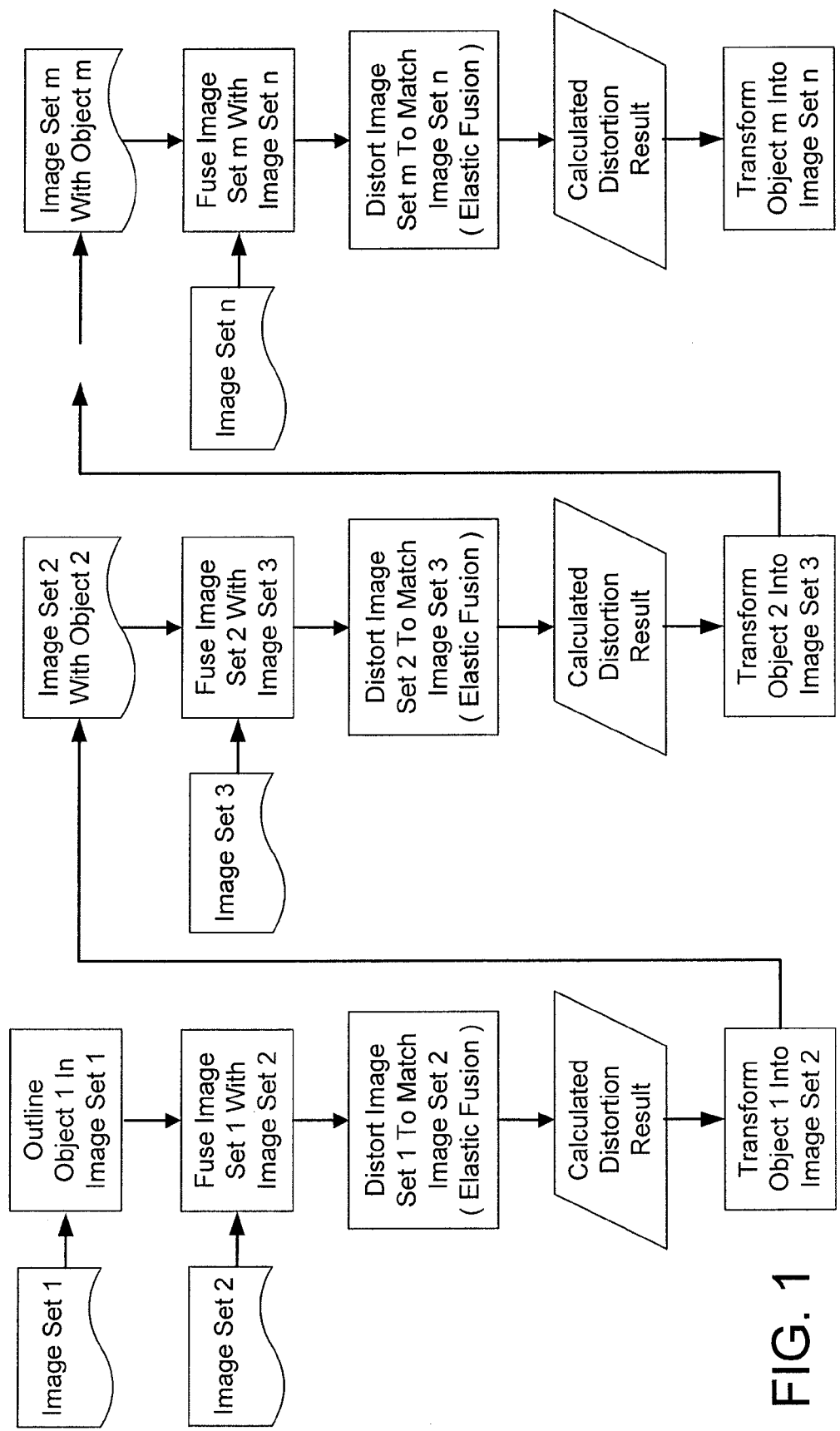
FIG. 1 is a flowchart illustrating the transfer of an outlined object in a first image set to further image sets according to a first embodiment.

FIG. 1 shows the workflow for transferring an outlined object in a first image or data set to further image or data sets according to a first embodiment using a cascading transfer from one image or data set to the respective next image or data set.

As can be seen from FIG. 1, an object is outlined in a first image or data set being the reference data set. The first image set is fused with a second image set. The first image set is then distorted to match the second image set, e.g. by elastic fusion. The distortion result is calculated and based on this calculation, the object outlined in the first or reference image set is transformed or transferred into the second image set.

Thereafter, this second image set includes the deformed or shifted object previously outlined only in the first image set. A third image set is then fused with the second image set and the previously described steps are repeated, thereby obtaining the transformed outlined object within the third image set.

As shown in FIG. 1, these steps can be repeated for all n available image sets to obtain respective transformed outlined objects within each image set based on the outlined object in the first image set.

Figure 2:
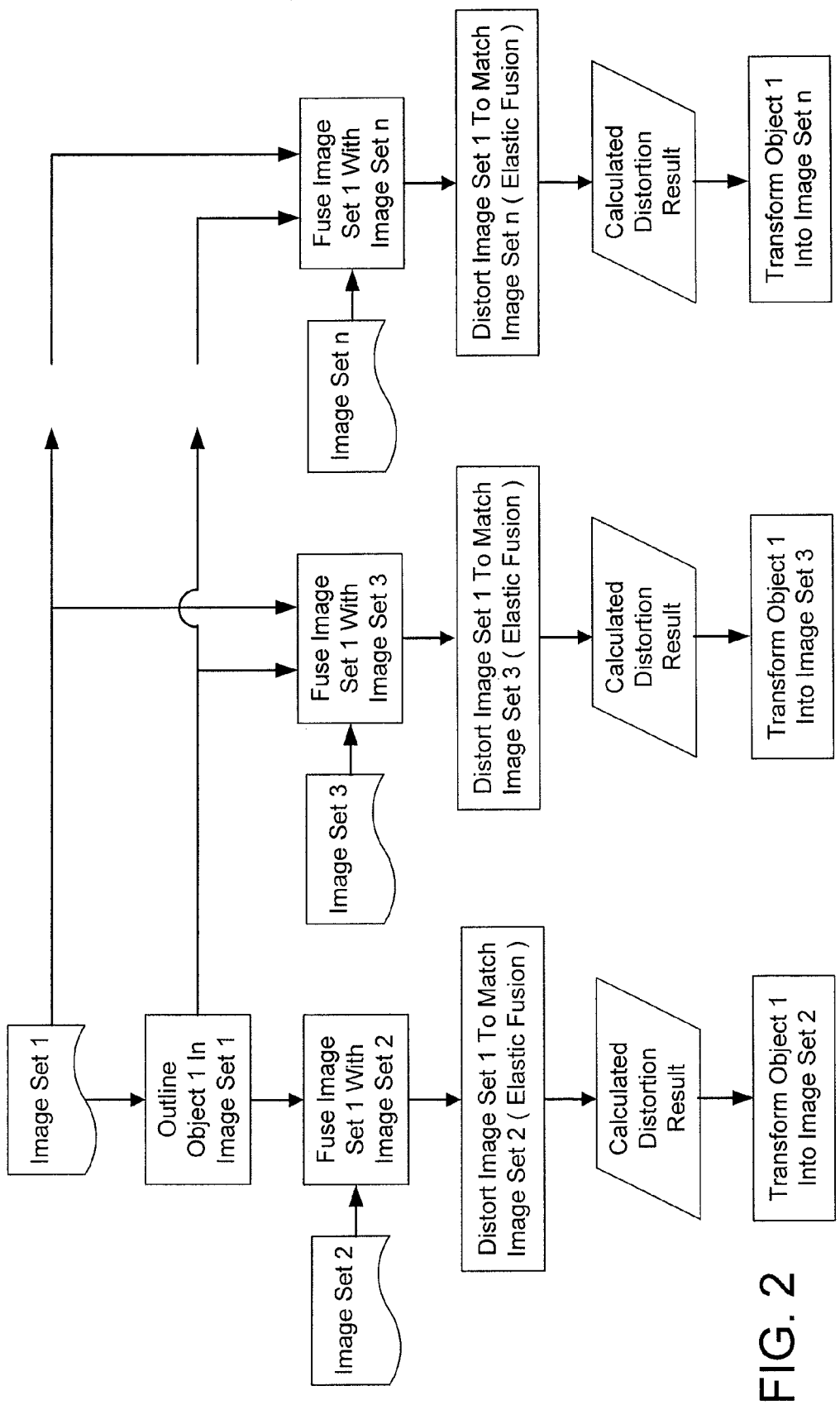
FIG. 2 is a flowchart illustrating the transfer of an outlined object in a first image set to further image sets according to a second embodiment.

FIG. 2 shows a second embodiment differing from the above first embodiment in that instead of the cascading transfer each further second, third, . . . n image set is fused with the first image set to subsequently obtain the transformation object outlined only in the first image set to be included in the respective further image sets.

Figure 3:
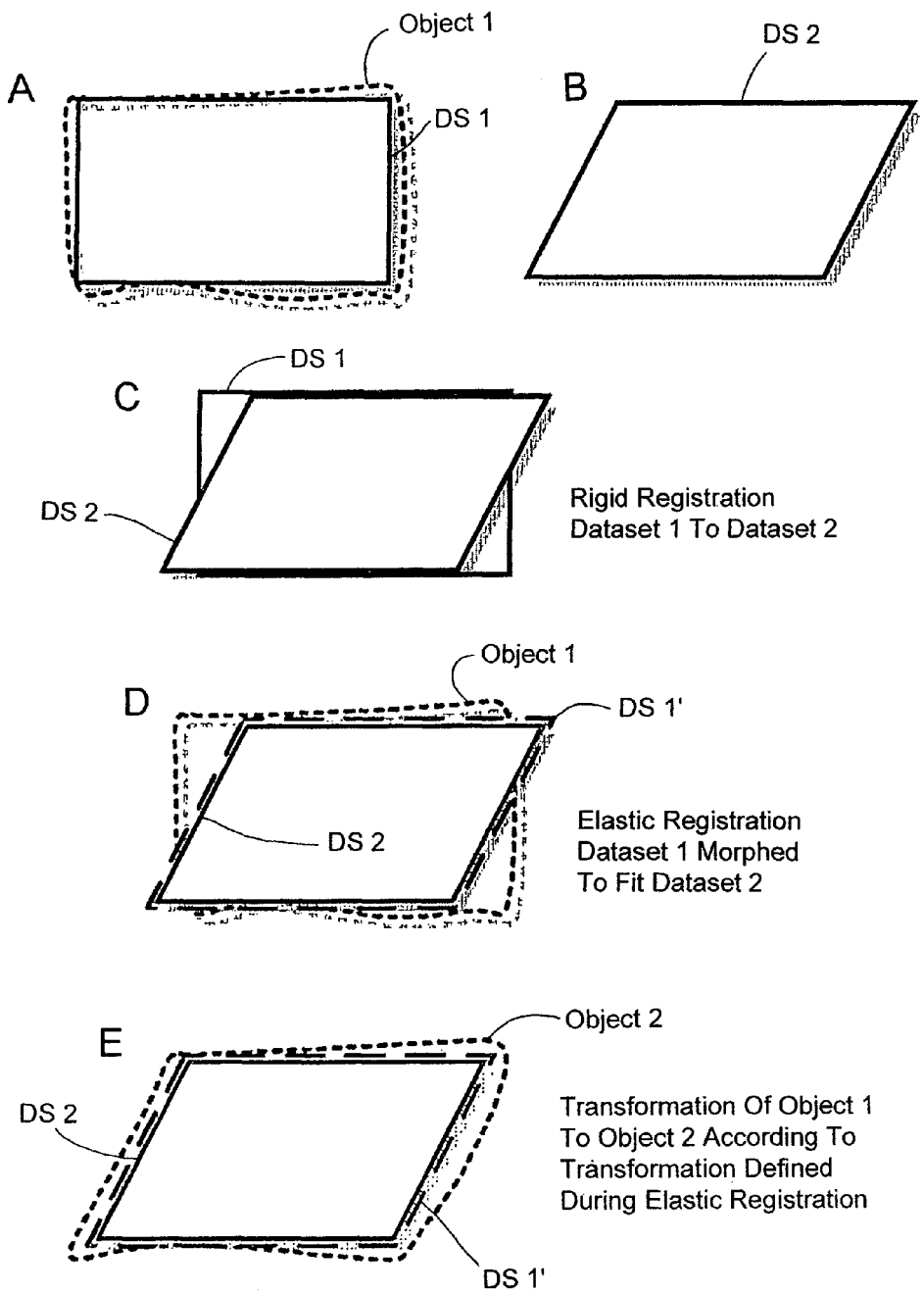
FIGS. 3A to 3E show the transformation of an outlined object according to an embodiment.

FIG. 3 shows an embodiment of a method for transforming an object 1 outlined in a first data set DS1 into a second data set DS2 having a different shape than the first data set DS1, as shown in FIGS. 3A and 3B.

In a first step, as shown in FIG. 3C, a rigid registration is performed to match data set DS1 to data set DS2.

Thereafter, as shown in FIG. 3D, an elastic registration is performed to morph data set DS1 to fit data set DS2, wherein morphed data set 1 is shown as DS1' in broken lines.

As shown in FIG. 3E, object 1 is transformed into object 2 using the transformation defined during the elastic registration shown in FIG. 3D. In other words, the deformation or transformation of data set DS1 to obtain data set DS1' is applied to object 1 to obtain object 2 which defines the position of object 1 in data set DS2.

Figure 4:
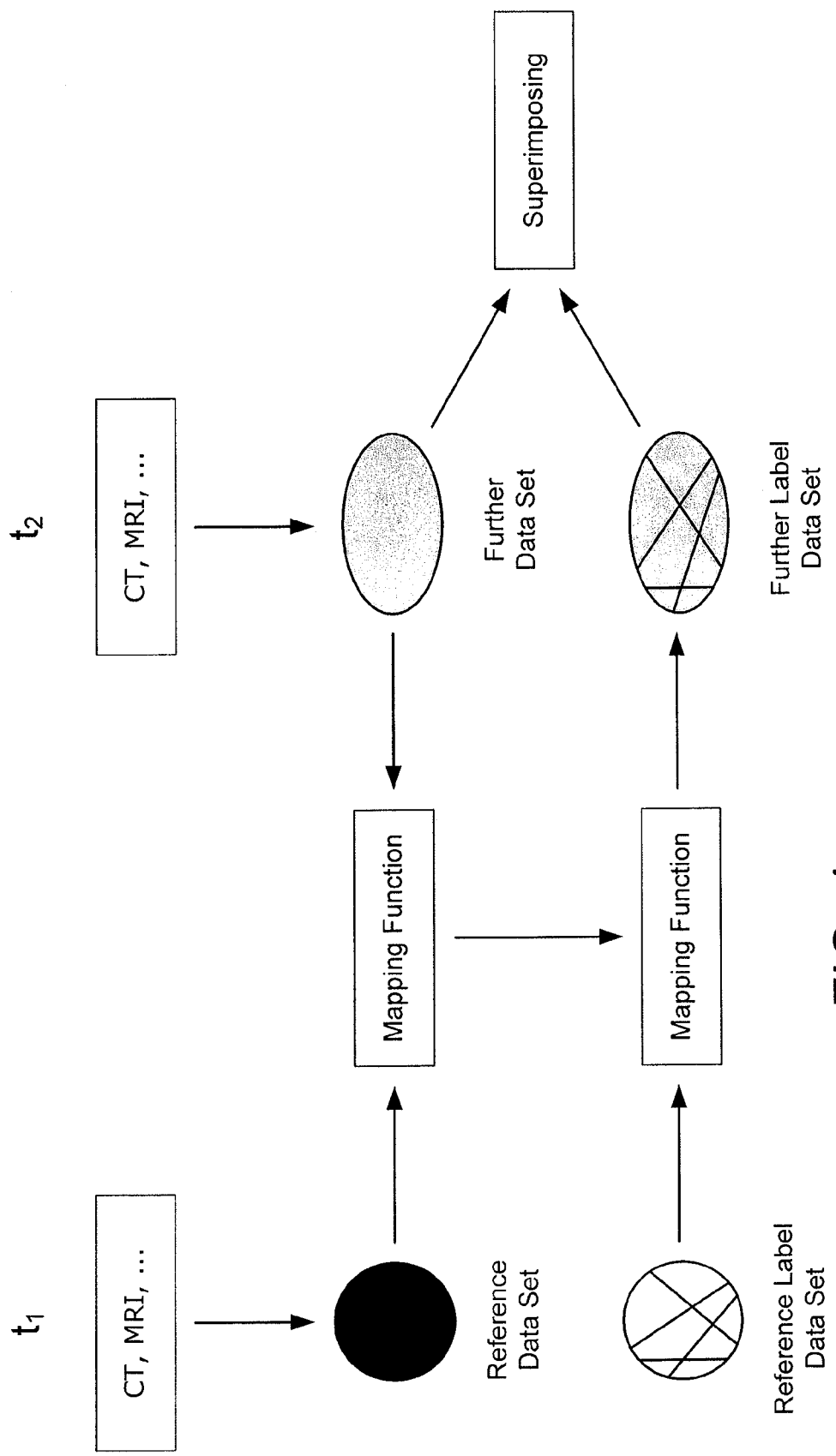
FIG. 4 is a diagrammatic illustration of a method for localizing at least one structure in accordance with the invention.

With reference to FIG. 4 a method for automatically localizing at least one object or structure in a further data set is provided. A series of data sets are obtained or scanned using computer tomography (CT), nuclear spin resonance (MRI) or other methods. A predetermined reference data set, such as for example the first data set taken at a first time t1, is selected and a mapping function is searched for, using which the reference data set can be mapped onto the further data set. This mapping function defines, for example, how individual elements of the reference data set are shifted in order to approximately or exactly correspond to the further data set taken at a different time t2.

A reference label data set including the information or position or surfaces of outlined objects is assigned to the reference data set. The reference label data set can, for example, describe the arrangement and delineation of objects or anatomical structures in the reference data set. If the mapping function for mapping the reference data set onto the further data set is known, then it can be used to map or transform the reference label data set accordingly, to obtain a further label data set which can be superimposed onto the further data set, as shown by way of example in FIG. 4. The further or transformed label data set contains information regarding the outlined objects or anatomical structures in the further patient data set which is initially predetermined merely as, for example, an intensity distribution.

Figure 5:
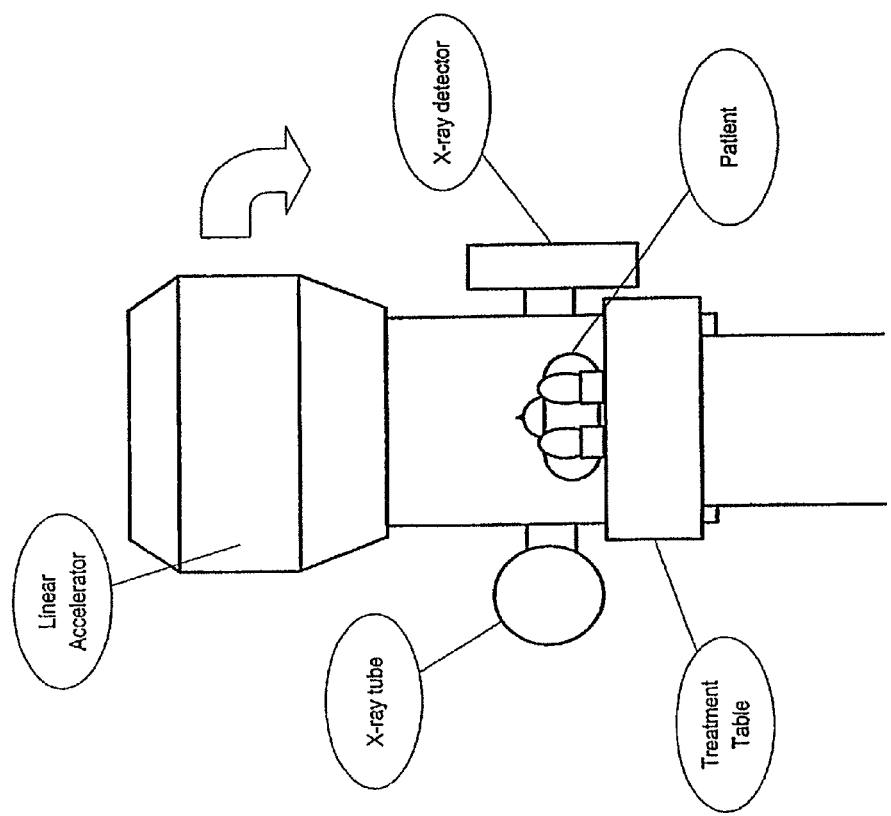
FIG. 5 is a diagrammatic illustration of a device used for radiotherapy controlled according to the invention.

FIG. 5 shows a device which can be used for radiotherapy controlled according to the present invention.

A patient is positioned on a treatment table, wherein a linear accelerator can move around the patient to generate the radiation used for radiotherapy. An X-Ray source, such as an X-Ray tube, is connected to the linear accelerator and moving together with the linear accelerator together with an X-Ray detector also being connected to the linear accelerator.

Prior to beginning the radiotherapy, a scan of predetermined objects, such as the prostate of the patient having a tumor, is performed to generate a reference data set. The position of the tumor is automatically or manually outlined in this reference data set to generate a reference label data set.

During radiotherapy, the images generated from the signals of the X-Ray detector are taken as further data sets and in accordance with the present invention, the current position of the tumor is calculated being the basis for the shape of the radiation generated by the linear accelerator.

Thus, using the present invention, radiotherapy can be performed to focus only on the object to be irradiated, even if this object moves in between different radiotherapy treatment fractions.

The invention claimed is:

1. A method for automatically localizing at least one object or structure in a second data set, wherein:
   a) a reference data set is provided;
   b) at least one object or structure is outlined or marked in the reference data set, the outline or marking information being a first or reference label data set;
   c) a mapping function is determined, using which said reference data set is approximately mapped onto said second data set; and
   d) the reference label data set assigned to said reference data set is transformed into a second label data set using said mapping function, wherein the method is repeated for further n data sets using the first or (n−1)-th label data set as the reference label data set to calculate the n-th label data set.

2. The method as set forth in claim 1, wherein said reference data set is determined using the same measuring method as is used to obtain said second data set.

3. The method as set forth in claim 1, wherein the data sets represent two-dimensional images or three-dimensional volumes.

4. The method as set forth in claim 1, wherein the mapping function includes at least one of (i) a transforming operator, (ii) a rotating operator, (iii) a shearing operator, and (iv) a deforming operator.

5. The method as set forth in claim 1, wherein the mapping function is determined using a hierarchical method including performing a rigid transformation and an elastic transformation.

6. The method as set forth in claim 1, wherein the reference data set is selected from a number of predetermined reference data sets, depending on characteristics of an object characterized by the second data set.

7. The method as set forth in claim 1, wherein the reference data set and the second data set are fused by using the same frame of reference or scanner.

8. The method as set forth in claim 1, wherein the method is used to localize tumors or brain structures.

9. The method as set forth in claim 1, further comprising: superimposing the second label data set onto the second data set.

10. The method as set forth in claim 1, wherein the position or area irradiated during radiotherapy is calculated based on the position of the object or structure in the second label data set.

11. A non-transitory computer readable medium comprising computer executable instructions adapted to perform the method in accordance with claim 1.

12. A method for automatically localizing at least one object or structure in a second data set, wherein:
   a) a reference data set is provided;
   b) at least one object or structure is outlined or marked in the reference data set, the outline or marking information being a first or reference label data set;
   c) a mapping function is determined, using which said reference data set is approximately mapped onto said second data set; and
   d) the reference label data set assigned to said reference data set is transformed into a second label data set using said mapping function, wherein the mapping function is determined using a hierarchical method including performing a rigid transformation and an elastic transformation, and wherein the elastic transformation is performed only on regions surrounding or being directly adjacent to the outlined or marked object.

13. A method for automatically localizing at least one object or structure in a second data set, wherein:
   a) a reference data set is provided;
   b) at least one object or structure is outlined or marked in the reference data set, the outline or marking information being a first or reference label data set;
   c) a mapping function is determined, using which said reference data set is approximately mapped onto said second data set; and
   d) the reference label data set assigned to said reference data set is transformed into a second label data set using said mapping function, wherein only a the rigid transformation of the mapping function is used for transforming the reference label data set, wherein the method is repeated for further n data sets using the first or (n−1)-th label data set as the reference label data set to calculate the n-th label data set.

14. A device for localizing at least one object or structure in a second data set, said device comprising:
   a data input device which receives the second data set;
   a memory which stores a reference data set together with a corresponding reference label data set; and
   a processor which determines a mapping function for mapping the reference data set onto a second data set or vice versa and for mapping said reference label data set onto a second label data set, using the determined mapping function, wherein the mapping is repeated for further n data sets using the first or (n−1)-th label data set as the reference label data set to determine the n-th label data set.

15. The device as set forth in claim 14, further comprising a measuring device for capturing the second data set.

16. The device as set forth in claim 14, further comprising a data output device for displaying the second data set, the reference data set, the reference label data set and the second label data set.

17. The device as set forth in claim 14, further comprising a radiation source or linear accelerator controlled by the processor using the calculated second label data set.

\* \* \* \* \*